Aug. 23, 1966  E. C. SNYDER  3,268,316
METHOD OF PRODUCING WELDED DOUBLE GLAZING UNITS
Filed Oct. 14, 1963  2 Sheets-Sheet 1

INVENTOR.
EDWIN C. SNYDER
BY
Oscar H Spencer
ATTORNEY

Aug. 23, 1966　　　　E. C. SNYDER　　　　3,268,316
METHOD OF PRODUCING WELDED DOUBLE GLAZING UNITS
Filed Oct. 14, 1963　　　　　　　　　　　　　　2 Sheets-Sheet 2

INVENTOR.
EDWIN C. SNYDER
BY
Oscar H. Spencer
ATTORNEY

── # United States Patent Office 3,268,316
Patented August 23, 1966

3,268,316
METHOD OF PRODUCING WELDED DOUBLE GLAZING UNITS
Edwin C. Snyder, Lincoln, Ill., assignor to Pittsburgh Plate Glass Company, Pittsburgh, Pa., a corporation of Pennsylvania
Filed Oct. 14, 1963, Ser. No. 315,989
6 Claims. (Cl. 65—54)

This invention relates to an improved method and apparatus for producing glass windows comprised of two of more sheets of glass in spaced relation and more specifically to a process for electrically welding together the adjacent marginal edges of the sheets.

A process for making units of this type is disclosed in U.S. Patent No. 2,624,979. The process comprises supporting two sheets of glass in superposed but slightly spaced relationship to each other, heating the margins of the upper sheet until they droop and become welded with the margins of the lower sheets, pulling the upper sheet upwardly to provide a chamber between the sheet and abruptly increasing the air pressure within the unit to effect filleting of the welded connection between the sheets. The units have a pore opening, either in a face or an edge of the unit, to allow for equalization of the pressure of the air within the unit with atmospheric pressure during cooling and annealing of the unit. The heating of the edges of the glass is effected by localized electrical heating. In order to initiate the electrical heating operation, a stripe of an electrically conductive material, such as colloidal graphite, is applied to the upper sheet of glass near the edges of the sheet. Such stripe extends continuously around the periphery of the sheet and may be on either the top or the bottom surface of the top sheet. An electric current is then passed through the stripe to effect heating of the stripe and the glass immediately adjacent thereto. As the temperature of the glass rises in the vicinity of the stripe, the glass itself becomes a conductor and the electrical heating can be continued in the glass even after the electrically conductive stripe has been burned away.

In the presently known process as described above for making units of this type, the lower sheet of glass is supported upon a horizontally disposed refractory platen. To provide edge support for various sizes of glass and to facilitate replacement of marginal portions of the platen support that become damaged from arcing at the electrodes and the heat generated during the welding process, it has been convenient in the past to support the central portion of the bottom glass sheet upon a central refractory platen and to support the edges of the bottom glass upon refractory blocks, such as soapstone. These blocks would abut each other and also the central platen and form a continuous border about the platen, extending the plane of support a distance slightly beyond the marginal portions of the glass sheet.

Because the heated edges of the bottom sheet of glass would tend to stick to the supporting platen or border blocks during the welding process, a separating material, such as a micaceous material, has heretofore been applied to the bottom surface along the marginal edges of the bottom sheet of glass. This material forms a separating layer between the glass and refractory support members during the welding process and prevents the glass from adhering to the edge support.

In the welding process, as described in the above mentioned patent, the edges are electrically heated by cycling an electric current about the marginal edge of the upper glass sheet under automatic control, such as disclosed in U.S. Patents Nos. 2,389,360 and 2,394,051, until the sheets have become welded.

In accordance with the present invention, the above-described welding or fusing process has been improved by supporting the marginal edges of the lower sheet of glass at only spaced locations about the periphery, e.g., beneath only the four corners of a rectangular sheet of glass. As a result, the product as well as the process has been materially improved. It was found that edge supports beneath the lower glass sheet acted as heat sinks that retarded the localized heating of the bottom edges of the unit, necessitating a disadvantageously long heating time. Such heating times allowed heat to permeate into and soften central portions of the sheets.

This, in turn, necessitated edge support to prevent deformation. Edge support, then, was a primary cause of the ill it cured; and, while curing the ill, it caused several undesirable side effects, the most distressing being sharp edges that formed at the outermost portion of the weld due to glass contact with the edge support.

In the improved welding operation of the present invention, edge welding may now be accomplished with enough speed that the central portions of the glass sheets remain sufficiently rigid to maintain the desired flatness of the finished unit without complete edge support. As a result, the finished unit is much improved. The outer edge of the weld now becomes rounded and firepolished because of the higher local temperatures, free viscous flow and surface tension forces that act on the glass. Heretofore, a sharp, rough edge was formed due to contact between the supporting plate or soapstones and the lower glass sheet. These improved edges are of extreme importance to personnel handling the welded double glazing units, not only in the manufacturing process, but also in the subsequent fabrication of framed window units. In addition, any flaws in the cut edge of the glass are healed by the firepolishing. Heretofore it has been necessary to place the scored surfaces of the glass sheets on the inside of the unit to assure that the flaws created by the scoring operation along the cut edges would not be exposed. Such flaws were points of incipient weakness when located on an outer, nonfirepolished edge of a unit.

For a better understanding of the invention, reference may now be had to the accompanying drawings in which like numerals refer to like parts throughout and in which.

Figure 1:
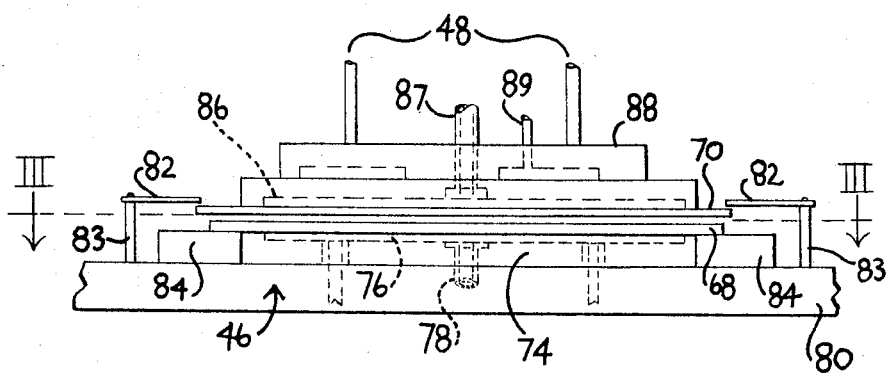
FIG. 1 is a diagrammaitc arrangement of apparatus for welding sheets of glass.

There is shown in FIG. 1 an embodiment of apparatus for use in forming all-glass, welded-edge, double glazing units. This apparatus includes a loading station 10, a preheating chamber 12, a welding chamber 14, and an annealing chamber 16. The chambers 12, 14 and 16 are constructed of an appropriate refractory material such as firebrick.

Chambers 12, 14 and 16 contain electrical heaters 18 for controlling temperatures during the process. The preheating chamber 12 is provided with an outer passageway or inlet 20 having a closure 22 that may be raised or lowered by means of a conventional closure operating mechanism 24. A pair of glass sheets 25 to be welded to form a double glazing unit are preheated in chamber 12 to a suitable temperature of between about 750° Fahrenheit and 900° Fahrenheit to prevent breakage of the glass from the thermal stresses during subsequent welding operations.

The chamber 12 communicates with the welding chamber 14 through a passageway 26 formed below the partitioning wall 28 between chambers 12 and 14. A similar passageway 30 provides communication below the partitioning wall 32 between the welding chamber 14 and the annealing chamber 16.

A trackway 34 is provided to carry the sheets of glass 25 through chambers 12, 14 and 16 for successive operations. This trackway 34 extends through the passageways 20, 26 and 30 to the chambers 12, 14 and 16 and preferably extends sufficiently far outside the chamber 12 to facilitate loading in station 10. Upon the trackway 34 is disposed a first transfer car 36. The car is preferably constructed of stainless steel and travels upon wheels 38 riding on track 34. The upper surface of the car is provided with a series of graphite studs or buttons 40 designed to hold the pair of glass sheets 25 in spaced relation with respect to the car framework. The car 36 may be reciprocated upon the trackway by any convenient apparatus, e.g., a rack and pinion arrangement or a chain and pulley arrangement (not shown).

The sheets of glass 25 are preheated upon the car 36 in chamber 12 and are then run into the welding chamber 14 for the subsequent edge fusing and shaping to form a double glazing unit.

The apparatus within the welding chamber includes an upper vacuum platen assembly 44 and a lower vacuum platen assembly 46. The upper platen assembly 44 is connected to the lower extremities of vertical supports 48 that pass through the roof of the chamber 14 and are permanently attached, as by welding to a horizontal mounting plate 50. The plate 50 is connected to a lower extremity of a piston rod 52 vertically movable by a fluid operated cylinder 54 mounted on a frame element 55 above the roof of chamber 14.

Extending through holes 56 in the platen of the lower platen assembly 46 from beneath the welding chamber 14 are glass supporting means 58. These supporting means are in the form of four vertical rods 60 having uppermost tips capped with a material, such as asbestos, that will not mark or break the glass or deteriorate at the operating temperatures of the welding furnace. The lower ends of the rods 60 are fastened to a horizontal mounting plate 62 that is mounted on the end of a piston rod 64 of a fluid operated cylinder 66. The vertical rods 66 are reciprocated through the bottom of the welding chamber 14 upon actuation of cylinder 66.

In one mode of operation, the bottom glass sheet 68 and the top glass sheet 70 of the pair of glass sheets indicated generally at 25 are carried into welding chamber 14 in sandwich form on car 36 after they have been preheated in chamber 12. The car 36 is moved into the chamber 14 and stopped so that the pair of glass sheets 25 is directly above the glass supporting means 58. The piston rod 64 is actuated upwardly in the cylinder 66 to raise vertical rods 60 through holes 56 in the platen of the lower platen assembly 46, and through slot openings in carriage 36 to engage the bottom surface of the bottom glass sheet 68 and raise the pair of glass sheets 25 a few inches off the graphite supporting knobs 40.

The car 36 is retracted along track 34 toward the preheating chamber 12 and the pair of glass sheets 25 are lowered onto assembly 46 by the retraction of piston rod 64 in cylinder 66. The supporting means 58 is lowered a distance sufficient to position the uppermost tips of the rods 60 below the top surface of the platen of assembly 46, the pair of glass sheets 25 then being supported by the platen assembly 46.

The upper vacuum assembly 44 is lowered to engage the top surface of the top glass sheet 70 and a vacuum is applied thereto. The assembly 44 and the sheet 70 attached thereto are raised a short distance into proper position for welding and are maintained in such position preparatory to the commencing of the welding operation.

The glass is at a temperature of about 900 degrees Fahrenheit as a result of the preheating operation. The edges of the upper glass sheet are raised in temperature by the appliction of electrical energy sequentially along each side of the glass sheet. Because the current that a given voltage will produce in glass depends on the resistance of the glass between electrodes and, hence, on its temperature, the conductive condition of the given path through the glass itself is utilized to determine the duration of the power application over such path required to bring it to the desired temperature. Thus, by applying the current at some predetermined value on one edge of the sheet and then tripping a control circuit to switch the current to the next adjoining edge of the sheet when the glass reaches a desired temperature and so continuing around the sheet repeatedly, the temperatures of all edges are maintained approximately uniform while being gradually raised. One application of electrical energy around the sheet is considered a completed cycle.

The preferred form of the process of the present invention requires seven heating cycles to complete the weld. Starting with an initial temperature of about 900 degrees Fahrenheit the temperature of the marginal edges of the glass is gradually and substantially uniformly raised to about 1900 to 2300 degrees Fahrenheit. This increase in temperature reaches a maximum in the area of the weld, i.e., the area of fusion, and rapidly decreases towards the center of the sheet. The maximum temperature is reached only after the stripes have been sublimated.

The upper sheet softens from the heat of the first few cycles and sags to engage the lower sheet. The subsequent cycles further raise the temperature of the marginal edges of the glass sheet to where the abutting portions of the upper and of the lower sheets soften and merge into substantially one homogeneous mass. After the fifth cycle the air space in the unit is established by slowly withdrawing the upper sheet from the lower sheet until the spacing between the sheets reaches the desired amount. At the end of the seventh cycle air is injected into the unit through a pore hole in one of the sheets to round the inner portion of the weld.

Figure 2:
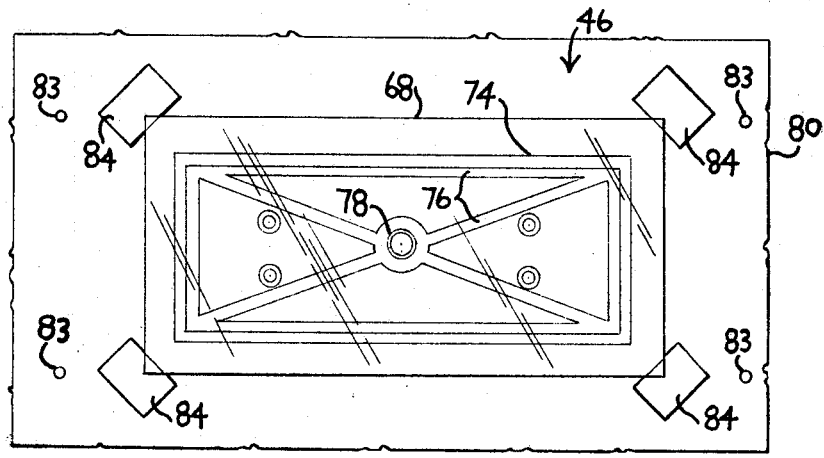
FIG. 2 is an elevation view of the upper and lower supporting platens and lower corner supporting stones.
Figure 3:
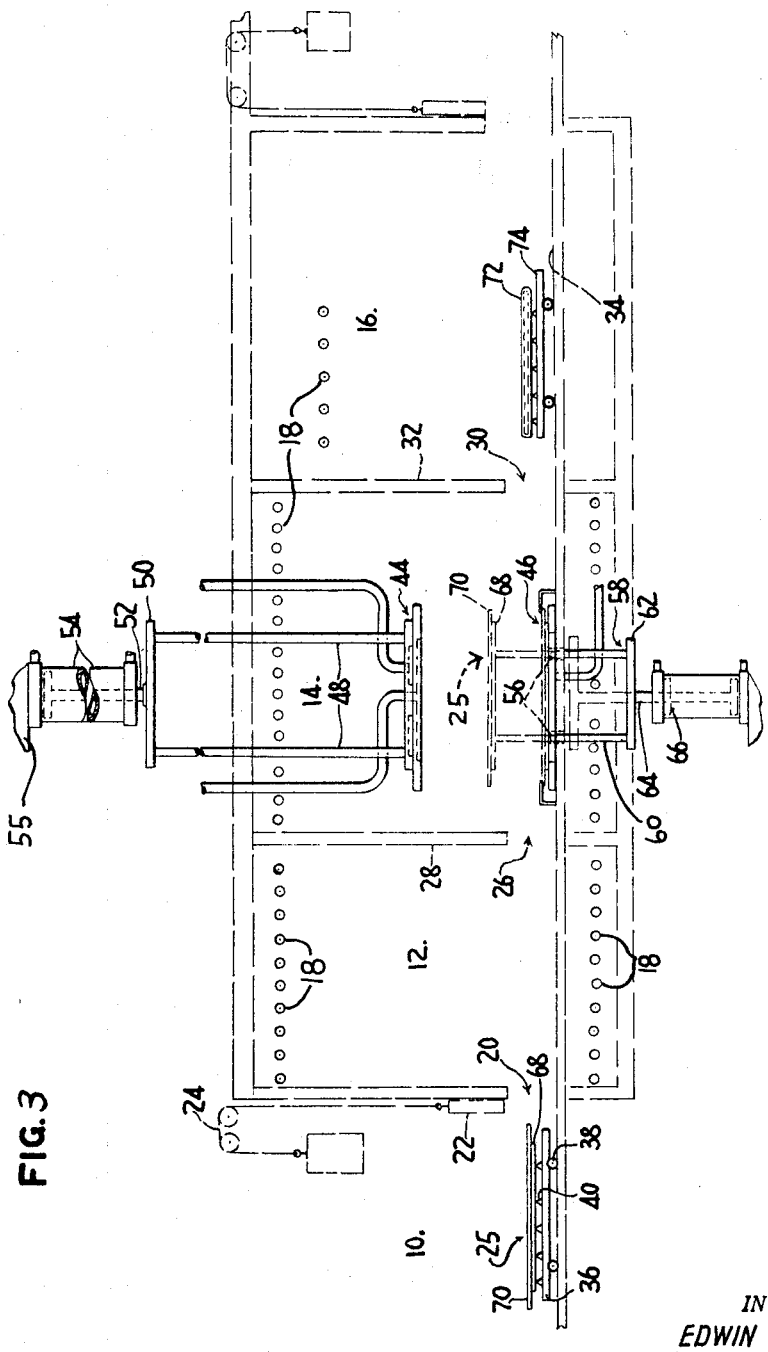
FIG. 3 is a plan view taken along the lines III—III of FIG. 2 and showing the lower planten assembly and bottom glass sheet prior to welding.

FIGS. 2 and 3 show the lower platen assembly 46 in greater detail. The lower platen 74 is smaller than, but in the general shape of, the lower sheet of glass 68, thereby permitting the area of fusion of the marginal edges of the glass sheet to extend beyond the lower platen. Grooves 76 in the upper surface of the lower platen 74 are connected by a conduit 78 to a vacuum source so that the lower sheet of glass 68 is held securely to the lower platen 74 during the welding and forming operations. Lower platen 74 is formed of a suitable refractory material such as high silica glass and is preferably in fixed position upon a horizontally disposed lower support 80.

At each corner of the lower platen 74 and beneath electrodes 82 on supporting rods 83 (see FIG. 2) are blocks 84 of refractory material, such as soapstone. These blocks are the same thickness as lower platen 74 and are of sufficient size to support the marginal edges of the lower glass sheet 68 at each corner while extending only a short distance, e.g., one-half inch or less, along each edge. Blocks 84 may be oriented in any convenient manner to support spaced portions of the periphery, one convenient arrangement for supporting corner portions being shown in the drawings. More generally, the edge supports may be of any convenient shape and should contact the periphery at spaced locations along not more than 15 percent of the perimeter and preferably along not more than 5 percent.

As shown in FIG. 2, the upper sheet of glass 70 is suitably supported by vacuum platen assembly 44 in spaced relationship with the lower sheet of glass 68 and has marginal stripes (not shown) along the upper marginal edges of the glass sheet that cooperate with electrodes 82 at each corner of the sheet. The electrodes 82 are positioned to provide a slight spacing between the tips thereof and the edges of the upper glass sheet 70. When a voltage is applied to begin the welding process, the current arcs across the spacing to the conductive stripes.

Grooves 86 in the upper platen are connected with a vacuum source through a conduit 87. A vacuum chuck 88 supported by rods 48 and communicating with a separate vacuum source through a conduit 89 supports the upper platen and facilitates changing the platen for different size sheets of glass.

By way of an illustrative example, a double glazing unit was fabricated generally in the manner disclosed in U.S. Patent No. 2,624,979, but with the glass preheated to a temperature of 900° F. and with the welding operation carried out as follows:

A sandwich unit 42 that consisted of an upper glass plate 0.094 inch thick, 24 1/16 inches wide and 36 1/16 inches long and a lower glass plate 0.094 inch thick, 23 13/16 inches wide and 35 13/16 inches long, the upper plate extending a substantially equal amount beyond the vertical planes of each marginal edge of the lower sheet, was lifted from a car 36 in a welding chamber 14 by rods 60 actuated by a cylinder 66 and piston rods 64. Piston rods 64 and the rod 60 were then lowered to deposit the glass sheets on a lower platen assembly 46. No care was taken to orient the scored surfaces of the glass sheets in a predetermined position, e.g., in a position facing each other.

The lower platen assembly 46 included a central platen 74 that was 1 inch thick, 22 inches wide and 34 inches long, and four soapstone blocks 84, each 1 inch thick, 5 inches wide and 5 inches long. The soapstone blocks were positioned as shown in FIGS. 2 and 3 beneath the corners of the lower glass sheet.

The upper platen assembly 44 was lowered to contact upper sheet 70 and the top vacuum head was energized to secure the top glass sheet thereto. The upper vacuum head was raised by a cylinder 54 through supports 48 to separate the upper glass sheet 70 from the lower glass sheet 68 by a distance of approximately 1/16 inch.

An operator started the welding cycle and current was applied, first about the periphery of the upper glass sheet and, after the marginal edges sagged into contact with the lower sheet, about the periphery of both sheets to fuse them. Current was applied through seven cycles to heat the marginal edges to a temperature of approximately 2000 degrees Fahrenheit. A desired air space of 3/16 inch between the two sheets of glass in the finished unit was established during the last two cycles by raising the upper platen assembly 44 the required distance. At the end of the seventh welding cycle an air tube was positioned under automatic control adjacent a pre-existing pore hole positioned in a corner of the upper glass sheet. The operator, with manual control, then injected air into the unit through the air tube.

The total heating time of the welding cycle was approximately 70 seconds. In this time portions of the glass sheets inwardly of the marginal edges a distance of one inch or more were maintained at temperature generally below the deformation temperature of the glass and the ultimate flatness of the entire welded unit was commercially acceptable, notwithstanding the marginal support at the corners only by blocks 84.

An examination of the marginal edges of the unit welded in the manner above-described disclosed a rounded, fire-polished surface, smooth and suitable for handling, and substantially flaw free. A very small portion of each edge (about 2 percent of the perimeter of the unit) closely adjacent the corners and supported upon soapstone corner blocks 84 was slightly bulbous and fire-polished due to the high heat at the electrodes. If desired, the edge portions of the corners may be ground to reduce the bulbous contour.

It will be understood with respect to the above example that welding cycles differing from that specified above may be used without departing from the spirit of this invention. It is essential, however, that the marginal edge support be provided only at spaced locations and that heat be supplied to the marginal portion of the glass sheets at a sufficient rate to weld the sheets without heating central portions to temperatures at which the glass will deform if not physically supported. In general, it has been found that units of conventional sizes, e.g., units between the sizes of 22 by 18 inches and 48 by 72 inches utilizing glass thicknesses of 0.090 to 0.250 inch can be welded in times varying from about 25 to 40 seconds for the smaller units to a maximum of about 160 to 180 seconds for the largest units of relatively thick glass.

Various advantages accrue from the practice of the invention disclosed herein. For example, the parting material heretofore necessary to prevent the lower glass sheet from sticking to the lower platen support about the marginal edges is no longer necessary. Thus, the process of striping the lower glass sheet with a micaceous parting material, as set forth in U.S. Patent No. 2,999,036, may be omitted with an ultimate savings of from 35 to 40 percent of the mechanical striping equipment and turning mechanism previously necessary. Soapstones, heretofore utilized about the entrie periphery of the unit, may now be eliminated except for four corner soapstones. These stones are expensive to purchase, require fabrication, and last only a few days to a few weeks. The savings in cost for a medium sized, double glazing unit, by eliminating these soapstones, is approximately 1/2 cent per unit. In addition, the removal of the soapstones has eliminated a heat sink and has significantly reduced the time needed to heat the glass edges to a welding temperature.

The rounded fire-polished edges resulting from the lack of contact with lower refractory support members are not only safer to handle, but are also stronger because edge flaws are healed by the fire polishing.

Although the invention has been described in detail with respect to the embodiment above, it is to be understood that such details are not to be limitations upon the scope of the invention except insofar as set forth in the accompanying claims.

I claim:

1. In a method of forming an all-glass, electrically fused, double glazing unit, wherein a larger of two flat glass sheets is superposed above a smaller of the two sheets in spaced relation and extends a substantially equal amount beyond the vertical planes of each marginal edge of the lower sheet and wherein the larger sheet has connecting longitudinal stripes of electrically conductive material adjacent each margin thereof, the improvement comprising supporting a central portion of the lower sheet in a predetermined plane and supporting marginal portions of the lower sheet in said predetermined plane only at locations spaced from each other about the margin of the lower sheet, said lower sheet being unsupported along substantial marginal portions thereof disposed within the area of fusion, and cycling electric current through the stripes at a rate sufficiently rapid to heat soften and fuse the edges of the upper and lower sheets together before unsupported portions of the margin of the lower sheet become sufficiently softened to distort under the weight of the unit, whereby the unsupported marginal edges become rounded and fire-polished.

2. A method of forming rounded and fire-polished fused edges for a generally rectangular-shaped, all glass, electrically fused, double glazing unit during the fusing process wherein a larger of two flat glass sheets is superposed above a smaller of the two sheets in spaced relation and extends a substantially equal amount beyond the vertical planes of each marginal edge of the lower sheet and wherein the larger sheet has connecting longitudinal stripes of electrically conductive material adjacent the margins thereof, the improvement which comprises supporting marginal portions of said lower glass sheet at the corners only, said lower sheet being unsupported along substantial marginal portions thereof disposed within the area of fusion, and cycling electrical energy through the stripes and the marginal edges to heat soften the marginal edges of the sheets at a rate sufficiently rapid to fuse the edges of the two sheets together before the marginal edges of the lower sheet become sufficiently softened to distort from the weight of the unsupported portions of the sheets.

3. The method of claim 2 wherein the marginal portions of said lower glass sheet are supported beneath not more than 5 percent of the perimeter of said lower glass sheet.

4. In a method of forming an all-glass electrically fused double glazing unit, wherein a larger of two rectangular-shaped flat glass sheets is superposed above a smaller of the two sheets in spaced relation and extending a substantially equal amount beyond the vertical planes of each marginal edge of the lower sheet and wherein the larger sheet has connecting longitudinal stripes of electrically conductive material adjacent each margin thereof, the improvement which comprises supporting the smaller of the sheets below a central portion thereof and in a predetermined plane, supporting marginal portions of said smaller sheet in said predetermined plane but only beneath the corners of said smaller sheet, said smaller sheet being unsupported along substantial marginal portions thereof disposed within the area of fusion, and fusing the marginal edges of said larger sheet with the marginal edges of said smaller sheet by cycling electrical energy about the marginal edges of the glass sheets for not more than 180 seconds and at a rate sufficiently rapid to fuse the edges of the two sheets together before the marginal edges of the lower sheet become sufficiently softened to distort from the weight of the unsupported portions of the sheets.

5. In a method of forming an all-glass electrically fused double glazing unit, wherein a larger of two flat glass sheets is superposed above a smaller of the two sheets in spaced relation and extends a substantially equal amount beyond the vertical planes of each marginal edge of the lower sheet and wherein the larger sheet has connecting longitudinal stripes of electrically conductive material adjacent each margin thereof, the improvement which comprises supporting marginal portions of the lower sheet at only spaced locations, said lower sheet being unsupported along substantial marginal portions thereof disposed within the area of fusion, and cycling electrical energy through said stripes and marginal edges of the glass sheet for a period of time between 25 seconds and 180 seconds and at a rate sufficiently rapid to heat soften the marginal edges of the glass sheets and fuse the two sheets together along the marginal edges before the marginal edges of the lower sheet become sufficiently softened to distort from the weight of the unsupported portions of the sheets.

6. In a method of forming an all-glass, electrically fused, double glazing unit, wherein a larger of two flat glass sheets is superposed above a smaller of the two sheets in spaced relation and extends a substantially equal amount beyond the vertical planes of each marginal edge of the lower sheet and wherein the larger sheet has connecting longitudinal stripes of electrically conductive material adjacent each margin thereof, the improvement comprising supporting from below a central portion of the lower sheet in a predetermined plane, supporting marginal portions of the lower sheet in said predetermined plane beneath not more than 15 percent of the perimeter of said lower sheet at spaced locations along the perimeter, said lower sheet being unsupported along substantial marginal portions thereof disposed within the area of fusion, and heat softening the marginal edges of the sheets by cycling electrical energy at a rate sufficient to fuse them together before the marginal edges of the lower sheet become sufficiently softened to distort from the weight of the unsupported portions of the sheets.

References Cited by the Examiner

UNITED STATES PATENTS 2,624,979  1/1953  Clever et al. _____ 65—23

DONALL H. SYLVESTER, *Primary Examiner.*

G. R. MYERS, *Assistant Examiner.*